C. B. DEEDS.
PROTECTOR AND FASTENER FOR HORSE COLLARS.
APPLICATION FILED AUG. 30, 1909.
974,755.
Patented Nov. 1, 1910.
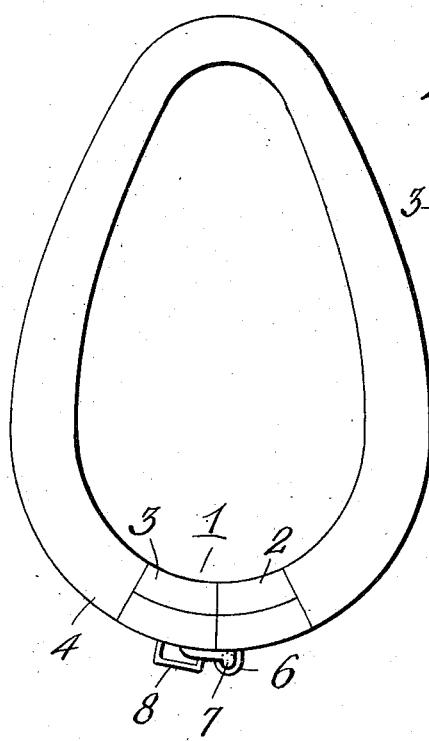
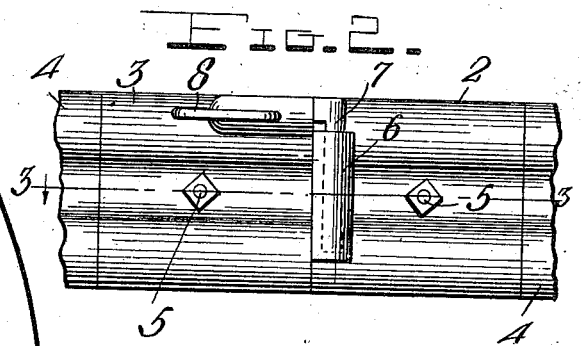
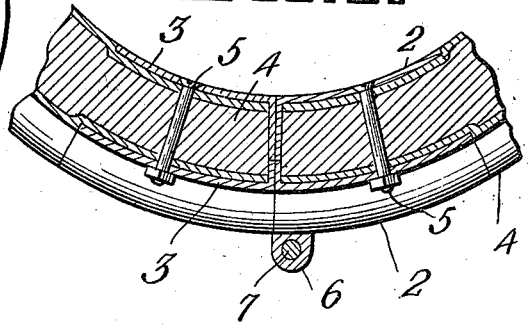
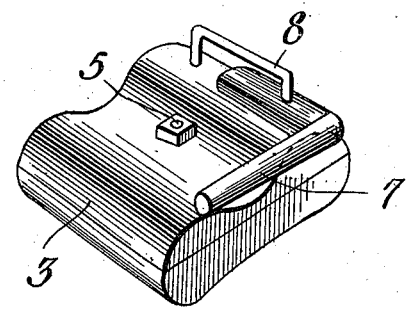
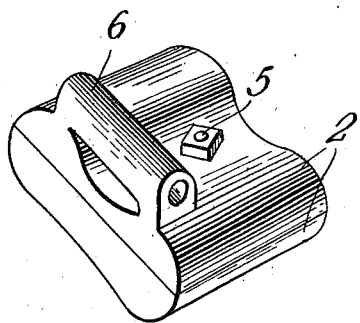
Witnesses
Chas. L. Griesbauer
C. H. Griesbauer
Inventor
Charles B. Deeds.
by H. B. Willson & Co.
Attorneys

UNITED STATES PATENT OFFICE.

CHARLES B. DEEDS, OF MOUNT CARROLL, ILLINOIS.

PROTECTOR AND FASTENER FOR HORSE-COLLARS.

974,755.  Specification of Letters Patent.  Patented Nov. 1, 1910.

Application filed August 30, 1909. Serial No. 515,241.

*To all whom it may concern:*

Be it known that I, CHARLES B. DEEDS, a citizen of the United States, residing at Mount Carroll, in the county of Carroll and State of Illinois, have invented certain new and useful Improvements in Protectors and Fasteners for Horse-Collars; and I do declare the following to be a full, clear, and exact description of the invention, such as will enable others skilled in the art to which it appertains to make and use the same.

This invention relates to improvements in combined protectors and fasteners for horse collars.

The object of the invention is to provide a combined protector and fastener for the ends of horse collars whereby said ends will be covered and protected from wear and from injuring the horse and by means of which the ends may be quickly secured when brought together around the neck of the animal.

A further object is to provide a protector of this character each member of which is formed in separate parts or sections adapted to be securely clamped into engagement with the ends of the collar.

With these and other objects in view, the invention consists of certain novel features of construction, combination and arrangement of parts, as will be more fully described and particularly pointed out in the appended claim.

In the accompanying drawings: Figure 1 is a front view of a collar showing the invention applied thereto; Fig. 2 is a bottom plan view of the same; Fig. 3 is a vertical longitudinal section of the device and the lower ends of the collar on the line 3—3 of Fig. 2; and, Figs. 4 and 5 are inverted perspective views of the two members of the protector showing the same disengaged or separated.

Referring more particularly to the drawings 1 denotes the protector and fastener which is in the form of two separably connected members 2 and 3 each of said members being formed in two parts or sections which when brought together form ferrules which are adapted to be engaged with the ends of the collar 4 thus covering and protecting said ends from wear and preventing the same from rubbing or injuring the horse. The two sections or parts of the members 2 and 3 are preferably secured together on the ends of the collar by clamping bolts 5 which are inserted therethrough and through the adjacent parts of the collar to which they are bolted.

On the outer face of the lower side of the member 2 is formed an elongated eye or socket 6 with which is adapted to be engaged a fastening pin 7 formed on or secured to the free end of the outer face of the opposite member 3 when said members are brought together after the collar has been swung around the neck of the horse, said pin extending beyond the free end of said member 3 and laterally spaced from the outer face of said member. The pin 7 when thus engaged with the socket 6 will securely hold the outer ends of the collar together in operative position. On the lower side of the member 3 of the protector adjacent to its outer edge is arranged a loop 8 with which is adapted to be connected the inner end of the pole strap of the harness. The construction of the loop 8 permits the use of a snap hook on the ends of the breast strap thus facilitating the engagement or connection of the strap with the collar.

From the foregoing description, taken in connection with the accompanying drawings, the construction and operation of the invention will be readily understood without requiring a more extended explanation.

I claim as my invention:

An attachment for horse collars comprising two members each with upper and lower sections and each having flanged inner ends, a horse collar having its ends arranged between said sections and contacting with said flanged ends, clamping means inserted through each member and through the ends of the collar, the lower section of one of the members having a transverse socket depending therefrom, the lower section of the other member having a loop depending therefrom, a pin having right angular arms, one of which is secured to the loop, the other arm of the pin being arranged transversely and projecting beyond the edge of said lower section and adapted to be inserted in said transverse socket.

In testimony whereof I have hereunto set my hand in presence of two subscribing witnesses.

CHARLES B. DEEDS.

Witnesses:
ARTHUR SUMMERVILLE,
FRANK H. HURLESS.